United States Patent

Tanaka et al.

[11] 4,077,936
[45] Mar. 7, 1978

[54] LIQUID SUSPENDING MEDIUM FOR ELECTROPHORETIC IMAGE DISPLAY/AND OR RECORDING DEVICE

[75] Inventors: Shigeru Tanaka, Neyagawa; Joichi Ohnishi, Toyonaka, both of Japan

[73] Assignee: Matsushita Electric Industrial Co., Ltd., Japan

[21] Appl. No.: 611,602

[22] Filed: Sep. 9, 1975

[30] Foreign Application Priority Data

Sep. 12, 1974 Japan .................. 49-105692
Sep. 12, 1974 Japan .................. 49-105693
Sep. 19, 1974 Japan .................. 49-108534

[51] Int. Cl.² .............. C08K 5/02; C09D 11/02
[52] U.S. Cl. .............. 260/33.8 R; 106/32; 106/287.1; 106/311; 260/38
[58] Field of Search .......... 106/311, 287 R; 252/546; 260/33.8 R, 38; 204/14, 299 EC

[56] References Cited

U.S. PATENT DOCUMENTS

| | | | |
|---|---|---|---|
| 2,915,416 | 12/1959 | West | 106/32 |
| 3,236,797 | 2/1966 | Williams | 260/29.6 H |
| 3,567,651 | 3/1971 | Giles | 252/301.19 |

OTHER PUBLICATIONS

Surface Active Agents & Detergents "Swartz & Perry" pp. 155–157.
Chem. Abstr. 81:107,573p.

*Primary Examiner*—Theodore Morris
*Attorney, Agent, or Firm*—Wenderoth, Lind & Ponack

[57] ABSTRACT

This invention provides a liquid suspending medium for an electrophoretic image display and/or recording device, comprising as a main component an oligomer of 1,1,2-trifluoro-2-chloro-ethylene expressed by

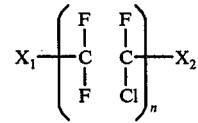

where $n$ is 2 or 3, and each of $X_1$ and $X_2$ is Cl or F. The use of this oligomer facilitates gravity adjustment between the liquid suspending medium and electrophoretic particles, and results in a liquid suspending medium highly suitable for an electrophoretic image display and/or recording device.

13 Claims, No Drawings

LIQUID SUSPENDING MEDIUM FOR ELECTROPHORETIC IMAGE DISPLAY/AND OR RECORDING DEVICE

This invention relates to a liquid suspending medium for an electrophoretic image display and/or recording device, and more particularly to the use of an oligomer of 1, 1, 2-trifluoro-2-chloro-ethylene as a main component of such liquid suspending medium.

Electrophoretic image display and/or recording devices are known in prior arts. For example, U.S. Patent 3,668,106 shows a typical example of such device. It comprises a suspension layer sandwiched between a pair of transparent electrodes. A typical suspension layer comprises a liquid, a dye and electrophoretic particles. The dye is dissolved in the liquid and the electrophoretic particles are dispersed in the liquid. Thus, the liquid suspends the electrophoretic particles. Therefore, the liquid, with some additive if desired, is called a liquid suspending medium. The electrophoretic particles are charged particles, negative or positive. When a D.C. voltage is applied to the electrodes, the electrophoretic particles are caused to electrophoretically move to and are attracted to either one of the electrodes. Thus, when the device is viewed from one electrode side to which the particles are attracted, the particles hide the liquid suspending medium, and so the color of the particles are viewed. On the other hand, when the device is viewed from the other electrode side to which the particles are not attracted, the liquid suspending medium colored by the dye hides the particles, and so the color of the liquid suspending medium is viewed. This is a typical mechanism for causing electrophoretic image display. If the D.C. voltage is removed after the electrophoretic movement of the electrophoretic particles, the particles are kept attached to the electrode, presumably due to Van der Waals force. Therefore, the displayed image can be maintained by removing the D.C. voltage of the electrode after the image display. This is a mechanism for causing electrophoretic image recording. Thus, this invention relates to a liquid suspending medium for an electrophoretic image display and/or recording.

Generally, when an electrophoretic suspension layer comprising a liquid suspending medium having electrophoretic particles dispersed therein is used for electrophoretic image display, it is advantageous to color the liquid suspending medium with darker color having hiding power for hiding electrophoretic particles such as black, red, blue and green and to color the electrophoretic particles with a lighter color having power for hiding the liquid suspending medium such as white and yellow, in order to obtain a high contrast of lightness of the displayed image. However, electrophoretic particles having a light color and at the same time having a high hiding power are mostly inorganic pigments having high specific gravity such as $TiO_2$, $BaSO_4$, ZnO, chrome yellow and CdS, and only a few organic pigments such as Hansa yellow 10G (specific gravity: 1.60).

In an electrophoretic image display device, the electrophoretic particles are required to be uniformly distributed in the suspension layer so as to obtain a uniform image. If pigments having a high specific gravity are used as electrophoretic particles, the specific gravity of the liquid suspending medium may become lower than that of the particles. If so, the particles are gradually precipitated in the suspension layer. This shortens the life of the display and/or recording device.

In the case when the electrophoretic particles such as inorganic and organic pigments have specific gravity lower than that of the liquid suspending medium, it is easy to adjust the specific gravity of the liquid suspending medium by adding a lighter liquid such as petroleum and vegetable oil in an appropriate amount to the liquid suspending medium. Therefore, it is easy to select pigments for the electrophoretic particles so as to make a suspension layer in which particles will not precipitate or float for a long time. On the other hand, in the case when the electrophoretic particles have specific gravity higher than that of the liquid suspending medium (for example $TiO_2$ powder as the electrophoretic particles), conventional materials having lower specific gravity such as resins are coated on the electrophoretic particles to lowering the apparent specific gravity of the particles so as to adjust the specific gravity relationship.

However, when the particles are coated e.g. with resin, the resin occupies the space between electrophoretic particles and so the hiding power of electrophoretic particles for hiding the liquid suspending medium decreases. This results in less clear images.

Thus, (1) the liquid suspending medium is required to have as high specific gravity as possible to facilitate the specific gravity adjustment and to enable use of a wide variety of selection of pigment particles as electrophoretic particles. In addition, it is also required that (2) the liquid suspending medium is highly electrically insulative and has high breakdown voltage for being used under a high electric field; (3) the liquid suspending medium is stable against light and heat; (4) the liquid suspending medium is in a liquid state over a wide temperature range such as between $-50°$ C and $+100°$ C, taking into consideration the temperatures to which the liquid suspending medium is exposed during being transported or in use at outdoor, in show windows, etc.; (5) the liquid suspending medium does not corrode the electrodes, electrophoretic particles and dyes in the device, and does not suffer electrolysis itself; (6) the liquid suspending medium has low viscosity; (7) the liquid suspending medium dissolves dyes well, other solvents (for adjusting the specific gravity and/or increasing the dissolving power thereof to dissolve the dyes) and surface active agents; (8) the liquid suspending medium is transparent and is thereby capable of being colored with any desired color; (9) the liquid suspending medium can well disperse the electrophoretic particles therein; and (10) the liquid suspending medium is of low toxicity in view of the social requirement not to cause environmental pollution.

Dimethyl sulfate and phosphoric acid, which are inorganic solvents, are known to have high specific gravity, but they do not meet the requirements (2) and (5) as set forth above. Halogenated solvents such as bromoform, di-iodo methane, 1,1,2,2-tetra-bromo-ethane and 1,1,2,2-tetra-chloro-ethane, which are organic solvents, are also known to have high specific gravity, but they do not meet the requirements (3) and (4), particularly (3). Further, halogenated solvents including fluorine such as 1,1,2-trichloro-1,2,2-tri-fluoro-ethane and 1,1,2,2-tetrachloro-1,2-difluoro-ethane meet many of the requirements, but they do not sufficiently satisfy the requirements (1) and (4).

On the other hand, 1,1,2,2-tetra-fluoro-1,2-dibromo-ethane is known to meet many of the requirements as set forth above, but is a little unsatisfactory with respect the requirement (4). However, it has been further found that it is not satisfactory with respect to the requirement (3). That is, 1,1,2,2-tetrafluoro-1,2-dibromo-ethane per se is stable against light and heat applied thereto. But when a mixture of it with a dye dissolved therein and electrophoretic particles dispersed therein is employed in the space between transparent electrodes spaced by 100 microns from each other, and 7,000 to 15,000 luxes of sun light or light of a high pressure mercury vapor lamp is applied thereto, the current flowing through the electrodes becomes greatly increased within several minutes or a few hours after the start of light application, for example several times greater than the current before the light application. This causes the electrophoretic particles to agglomerate and/or to reverse the polarity of their charges, and causes the device become inoperative.

Accordingly, it is a primary object of this invention to provide a liquid suspending medium for an electrophoretic image display and/or recording device, which satisfies all the requirements as set forth above.

It is a further object of this invention to improve the liquid suspending medium having satisfactory properties with respect to the above requirements already so as to eliminate harmful influence of the condition of the surface of the electrode, contacting the liquid suspending medium, on movement of the electrophoretic particles.

The primary object is achieved according to this invention by using an oligomer of 1,1,2-trifluoro-2-chloroethylene expressed by

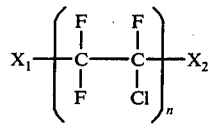

as a main component of the liquid suspending medium where n is 2 or 3, and each of $X_1$ and $X_2$ is one of Cl and F.

The further object is achieved according to this invention by adding, to the liquid suspending medium including the 1,1,2-trifluoro-2-chloro-ethylene oligomer, (1) an alkylamine salt of a polyacrylic acid expressed by

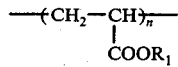

where $R_1$ is an alkyl ammonium radical from $C_1$ to $C_{18}$, and (2) one of (a) an alkylphenyl-ether of polyethylene-glycol expressed by

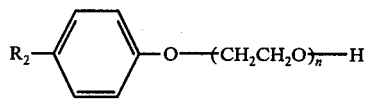

having an HLB value of 8 to 19, where $n$ is a higher number integer representing polymer, and (b) an alkyl-ether of polyethylene-glycol expressed by

having an HLB value of 8 to 19, where n is a higher number integer number representing a polymer.

The "oligomer of 1,1,2-trifluoro-2-chloro-ethylene" expressed here means a dimer ($n=2$) or trimer ($n=3$) or a mixture of a dimer and a trimer of 1,1,2-trifluoro-2-chloro-ethylene. Each end ($X_1$ or $X_2$) of the oligomer is stabilized by fluorine (F) or chlorine (Cl).

One example of such oligomer available in the market is Daifloil0 manufactured by Daikin Kogyo Co., Ltd., Japan (Daifloil0: trade name of Daikin Kogyo Co., Ltd.). When more than 98% of Daifloil0 is dimer, such Daifloil0 has a specific gravity of 1.746 (25°C/25°C), boiling point of 134° C, freezing point of lower than −50° C and viscosity of 1,676 cps (25° C), and is ordinarily colorless and transparent liquid. When more than 98% of the Daifloil0 is trimer, such Daifloil0 has properties similar to those of that of dimer, except that the boiling point, viscosity and specific gravity in the case of trimer are a little higher than those in the case of dimer. Likewise, also when it is a mixture of a dimer and a trimer of Daifloil0, it has similar properties. All the Daifloil's0, dimer, trimer or mixture of them, have high electrical insulative properties, high breakdown voltages, no corrosive force, no toxic property, high stability to light and heat, and high resistance to acid and alkaline material. The "high stability to light" means that it is unlikely to be decomposed by being exposed to light even for a long time, and when it is used as a main component of a liquid suspending medium in an electrophoretic display and/or recording device, the current between two electrodes in the device does not increase even by a long exposure to light. The "high stability to heat" means that it is unlikely to be decomposed by being exposed to heat even for a long time. The "high resistance to acid" and alkaline materials means that it is unlikely to be decomposed by being contacted with acid or alkaline material. It is thus clear that by using an oligomer of 1,1,2-trifluoro-2-chloro-ethylene as a main component of a liquid suspending medium in an electrophoretic image display and/or recording device, such device can have a long life. Such device is advantageous also because it can be operated with low electric power. Since 1,1,2-trifluoro-2-chloro-ethylene oligomer can satisfactorily dissolve a charge controller such as a surface active agent, an oil dye and other organic solvents, many desired colored liquid suspension layers can be obtained, and further particles can be uniformly and finely dispersed therein, resulting in resultant uniform and clear images in the display and/or recording device.

In the above chemical formula of 1,1,2-trifluoro-2-chloro-ethylene, if the $n$ value is one, the boiling point thereof is low and the specific gravity thereof is small. If the $n$ value is 4 or more than 4, the viscosity thereof is high.

A preferred amount of the 1,1,2-trifluoro-2-chloro-ethylene oligomer is 50 to 100 volume percent, more preferably 70 to 95 volume percent, on the basis of the liquid suspending medium. If the amount is too small, the effect of such oligomer usage is insufficient. The liquid suspending medium can be composed only of such oligomer (100 volume percent), but in order to allow other additive (solvent, surface active agent) to be included therein, it is more preferable that at least 5 volume percent of the liquid suspending medium be used for such additive.

Besides, the surface condition of the surface of an electrode contacting a liquid suspension layer in an electrophoretic image display and/or recording device sometimes exerts a harmful influence upon smooth and- /or uniform image formation. That is, repetitive electrophoretic movement of electrophoretic particles causes the particles to be attached to the surface of an electrode and to be separated from the electrode to which the particles have been attached. However, unless the surface (contacting the suspension) of the electrode is specially treated, some or all of the particles once attached to the electrode surface cannot be separated from the electrode again sometimes in the ordinary operation of the device, or can be separated from the electrode, but not smoothly or uniformly sometimes. For example, it occurs that one portion of the particles attached to the electrode surface is first separated from the electrode surface, another portion of the particles is then separated, and the other portion of the particles is then finally separated. Such three step separation, for example, prevents smooth and clear image display.

It has been found according to this invention that such problem is solved by adding to the liquid suspension medium mainly of the above-mentioned oligomer (1) an alkylamine salt of a polyacrylic acid expressed by

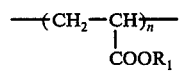

where $R_1$ is an alkyl ammonium radical from $C_1$ to $C_{18}$, and (2) one of (a) an alkylphenyl-ether of polyethylene-glycol expressed by

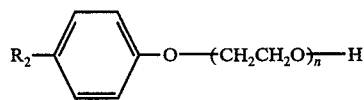

having an HLB value of 8 to 19, where $R_2$ is an alkyl radical having a C number preferably between $C_6$ and $C_{18}$ in view of the preferred HLB value of 8 to 19, and (b) an alkyl-ether of polyethylene-glycol expressed by

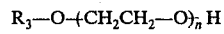

having an HLB value of 8 to 19, where $R_3$ is an alkyl radical having a C number preferably between $C_6$ and $C_{18}$ in view of the preferred HLB value of 8 to 19. In these chemical formulae, the $n$ value is a higher integer number representing a polymer.

By using such additives (1) and (2), smooth and uniform separation of particles attached to the electrode surface from the electrode surface can be achieved, without necessitating any special surface-treatment of the electrode. The preferred amount of the alkylamine salt of polyacrylic acid (1) is 0.05 to 2.5 volume parts, more preferably 0.2 to 2 volume parts, most preferably 0.2 to 1 volume part, on the basis of 100 volume parts of the liquid suspending medium. If the amount is too small, sufficiently smooth separation of electrophoretic particles from the electrode surface cannot be achieved. If the amount is too large, sufficiently uniform distribution of the electrophoretic particles in the liquid suspending medium upon voltage application cannot be achieved. A preferred amount of the alkylphenyl-ether or alkyl-ether of polyethylene-glycol (2) is 0.05 to 2.5 volume parts, more preferably 0.1 to 2 volume parts, most preferably 0.2 to 1.5 volume parts, on the basis of 100 volume parts of the liquid suspending medium. If the amount is too small, sufficiently smooth separation of electrophoretic particles from the electrode surface cannot be achieved. If the amount is too large, sufficiently uniform distribution of the electrophoretic particles dispersed in the liquid suspending medium upon application of D. C. voltage can hardly be achieved. The preferred amount of the salt (1) and the preferred amount of the ether (2) are related to each other. If a higher amount of the salt (1) is used, it is preferred to use a smaller amount of the ether (2), and vice versa. A single use of one of (1) and (2) does not have a good effect.

The use of the salt (1) and the ether (2) becomes more advantageous when they are used in such a liquid suspension (layer) in which each electrophoretic particle such as a $TiO_2$ particle is coated with a phenolic resin, and the liquid suspending medium contains a small amount of a petroleum (such as xylene) and a vegetable oil (such as olive oil) (for adjusting the specific gravity). The phenolic resin referred to herein is preferably a resol type phenolic resin (which is heat hardenable) obtained by reacting phenol with an aldehyde, using ammonium hydroxide or hydroxide of alkaline metal such as sodium hydroxie or using hydroxide of alkaline earth metal such as barium hydroxide as a catalyst.

The preferred HLB value of each of the ethers (a) and (b) is between 8 and 19. If the HLB value is too high or too small, a sufficiently smooth separation of electrophoretic particles from the electrode surface cannot be achieved.

The C number of $R_1$ is preferably not more than 18 because materials of a C number of more than 18 are rather difficult to obtain commercially. Of course, materials having a C value of more than 18 can also be used.

One example of an alkylamine salt of a polyacrylic acid available in the market is Disparlon KS-873 or Disparlon 860 manufactured by Kusumoto Chemicals Ltd., Japan (Disparlon KS-873 and 860: trade name of Kusumoto Chemicals Ltd.). One example of an alkylphenyl-ether and alkyl-ether of polyethylene-glycol available in the market are Noigen EA and Noigen ET manufactured by Dai-ichi Kogyo Seiyaku Co., Ltd., Japan (Noigen EA and ET: trade name of Dai-ichi Kogyo Seiyaku Co., Ltd.).

Besides, in the case when an electrophoretic liquid suspension (layer) is used in an X-Y matrix electrode panel, i.e. when the suspension is sandwiched between X-electrode group and Y-electrode group (X-electrode group consisting of parallel electrodes residing at one plane, Y-electrode group consisting of parallel electrodes extending in the direction perpendicular to the direction of the X-electrodes and residing at one plane, the two planes being parallel with and facing each other, and the electrophoretic suspension being filled in the space between the two planes, thereby the suspension at each crossing area between X-and Y-electrodes acting as a display element), then the suspension is required to have a threshold voltage. That is, if a voltage lower than the threshold voltage is applied to the suspension, the suspension does not show any electrophoretic movement of electrophoretic particles therein. But, if the applied voltage exceeds the threshold voltage, the suspension suddenly starts electrophoretic movement of electrophoretic particles therein.

It has been found according to this invention that when the above set forth 1,1,2-trifluoro-2-chloro-ethylene oligomer is used as a main component of the liquid suspending medium in the suspension layer, the preferred threshold voltage is achieved. In this case, it is not preferred to use the surface activator such as alkylamine salt of a polyacrylic acid or an alkylphenyl-ether or alkyl-ether of polyethyleneglycol, because they are likely to damage the threshold voltage.

In the following, examples for this invention will be shown, which illustrate preferred embodiments of this invention only, and which should not be construed to limit the scope of this invention.

EXAMPLE 1

100 grams of an ethanol solution of resol (solid ingredient: 58.7%, solid ingredient being measured by heating the solution to harden the solution, and the ratio thus hardened material to the original solution being 58.7%) synthesized by reacting phenol with formalin using ammonia as a catalyst, was mixed with 20.6 grams of $TiO_2$. This mixture was sufficiently uniformly mixed by a ball mill, and was then hardened by heating it at a temperature of 110° C for 10 hours. This hardened material was cooled, and was then finely pulverized by a ball mill to have particle sizes less than 10 microns. The thus pulverized powder was heated at a temperature of 150° C for 1 hour under a low pressure atmosphere (less than 3mmHg) so as to dry the powder. Thereby, a white powder was obtained, 83.9 ml of Daifloil0 manufactured by Daikin Kogyo Co., Japan, including more than 98% of dimer and having a viscosity of 1,676 cps at 25° C, 11.7 ml of m-xylene and 4.4 ml of an olive oil were mixed. To this mixture, 1.65 grams of Disparlon KS 873 manufactured by Kusumoto Chemicals Ltd., Japan, 0.33 gram of Noigen EA 120 manufactured by Dai-ichi Kogyo Seiyaku Co., Ltd., Japan, 400 mg of Macrolex Blue FR manufactured by Farbenfabriken Bayer AG., Leverkusen, Germany (Macrolex Blue FR: trade name of Farbenfabriken Bayer AG.) and 200 mg of Oil Red XO manufactured by Kanto Chemical Co., Inc., Japan (Oil Red XO: trade name of Kanto Chemical Co., Inc.) were dissolved. Thereby, a black colored liquid suspending medium was obtained. 6.7 grams of the above prepared white powder was mixed to the thus obtained black liquid and was well dispersed therein. Thereby, a grey colored suspension was obtained. This grey suspension was placed between a pair of parallel transparent conducting layers of indium oxide which are spaced 100 microns from each other and each of which was deposited on a glass plate. The distance 100 microns was held by using a glass fiber having a diameter of 100 microns. Thereby, an electrophoretic image display device was obtained. D.C. voltage of 100V was applied between the conducting layers (electrodes). Thereby, the anode side was observed white, and the cathode side was observed to be black. Then, the voltage polarity was reversed. Thereby, the black and white colors observed to be were reversed with respect to the sides of electrodes (conducting layers). Thus, the display device was a device usuable as a reversible white-black reversal display.

EXAMPLE 2

A display device having a blue colored suspension layer was prepared in the same manner as done in Example 1, except that 200 mg of Macrolex Blue FR was used here instead of 400 mg of Macrolex Blue FR and 200 mg of Oil Red XO used in Example 1. When a D.C. voltage was applied to the thus prepared device in the same manner as done in Example 1, the anode side was observed to be white and the cathode side was observed to be blue. Thus, the display device prepared here was a device usable as reversible white-blue reversal display.

EXAMPLE 3

A display device having an orange colored suspension layer was prepared in the same manner as done in Example 1, except that 23.5 grams of yellow pigments (Seika-Fast Yellow 2300: manufactured by and trade name of Dainichi Seika Color & Chemicals Manufacturing Co., Ltd, Japan) and 21.1 grams of $TiO_2$ were used here, instead of 20.6 grams of $TiO_2$ used in Example 1, so as to obtain a yellow powder, and 200 mg of Oil Red 5303 (manufactured by and trade-name of Arimoto Chemical Industry, Japan) was used instead of 400 mg of Macrolex Blue FR and 200 mg of Oil Red XO which are used in Example 1. When a D.C. voltage was applied to the thus prepared device in the same manner as done in Example 1, the anode side was observed yellow, and the cathode side was observed to be red. Thus, the display devide which was prepared here was a device usable as reversible yellowred reversal display.

EXAMPLE 4

A display device having an orange colored suspension layer was prepared in the same manner as done in Example 1, except that a red mixture of 78.7 ml of Daifloil 0 having a viscosity 1,676 cps at 25° C, 18 ml of m-xylene, 200 mg of Oil Red 5303, 445 mg of Disparlon KS-873 and 1.05 grams of Noigen EA 102 was used here instead of the black mixture of 83.9 ml of Daifloil 0, 11.7 ml of m-xylene, 4.4 ml of olive oil, 1.65 grams of Disparlon KS 873, 0.33 gram of Noigen EA 120, 400 mg of Macrolex Blue FR and 200 mg of Oil Red XO as used in Example 1, and that 5.25 grams of the yellow powder as obtained in Example 3 was used here instead of 6.7 grams of the white powder as obtained and used in Example 1. When a D.C. voltage was applied to the thus prepared device in the same manner as done in Example 1, the anode side was observed to be yellow and the cathode side was observed to be red. Thus, the display device prepared here was a device usable as reversible yellow-red reversal display.

Example 5

A display device having a yellowish green colored suspension layer was prepared in the same manner as done in Example 4, except that 100 mg of Macrolex Blue FR was used here instead of 200 mg of Oil Red 5303 used in Example 4. When a D.C. voltage was applied to the thus prepared device in the same manner as done in Example 1, the anode side was observed to be yellow, and the cathode side was observed green. Thus, the display device prepared here was a device usable as reversible yellow-green reversal display.

EXAMPLE 6

A display device having a pink colored suspension layer was prepared in the same manner as done in Example 1, except that a red mixture of 74.5 ml of Daifloil 0 including about 55% of trimer and about 45% of dimer having a viscosity of 3,985 cps at 25° C, 25.5 ml of m-xylene, 445 mg of Disparlon KS-873, 1.05 grams of Noigen EA-102 and 150 mg of Oil Red 5303 was used here instead of the black mixture of 83.9 ml of Daifloil 0, 11.7 ml of m-xylene, 4.4 ml of olive oil, 1.65 grams of Disparlon KS-873, 0.33 gram of Noigen EA 120, 400 mg of Macrolex Blue FR and 200 mg of Oil Red XO as used in Example 1, and the amount of the white powder used here was 5.5 grams instead of 6.7 grams used in Example 1. When a D.C. voltage was applied to the thus prepared device in the same manner as done in Example 1, the anode side was observed to be white, and the cathode side was observed to be red. Thus, the display device prepared here was a device usable as reversible white-red reversal display.

Thereafter, the six display devices as obtained in Examples 1 to 6 were subjected to a light exposure of 7000 luxes from a high pressure mercury vapor lamp from the cathode side of each device so as to measure the change of current flowing through the electrodes with the increase of the light exposure time (7000 × t lux.hour). (Under this condition, the deterioration of the operation of the device due to light exposure, i.e. increase of current due to light exposure, is smaller about 5 times than that in the case when the light is applied from the anode side, because the electrophoretic particles have electrophoretically moved and are attacked to the anode.) The currents measured with respect to the six devices at a time point of 5 hours after the start of light exposure were only 1.1 to 1.25 times larger than the initial currents before light exposure, respectively, and no other harmful change occurred.

For comparison, a display device was prepared in the same manner as done in Example 2, except that a mixture of 1,1,2,2-tetrafluoro-1,2-dibromo-ethane and an olive oil was used instead of the liquid suspending medium used in Example 2. The thus prepared device was subjected to the light exposure test as done above. It was observed that the current measured with respect to this device at a time 2 hours after the start of the light exposure was already about 6 times larger than the initial current before the light exposure, and the electrophoretic particles become agglomerated.

EXAMPLE 7

Two display devices were prepared in the same manner as done in Example 1 and 3, respectively, except that 1 gram of Noigen EA-102 and 0.5 gram of Disparlon KS-873 were used here instead of 0.33 gram of Noigen EA-120 and 1.65 grams of Disparlon KS-873. The thus prepared display devices were quite similar to and had a mode of operation quite similar to the display devices of Examples 1 and 3, respectively.

EXAMPLE 8

A display device was prepared in the same manner as done in Example 2, except that 1 gram of Noigen ET-83 and 0.5 gram of Disparlon KS-873 were used here instead of 0.33 gram of Noigen EA-120 and 1.65 grams of Disparlon KS-873. The thus prepared display device was quite similar to and had a mode of operation quite similar to the display device of Example 2.

What we claim is:

1. A liquid suspending medium for an electrophoretic image display and/or recording device, comprising as a main component an oligomer of 1,1,2-trifluoro-2-chloroethylene expressed by

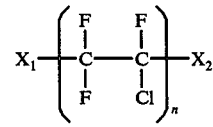

where $n$ is 2 or 3, and each of $X_1$ and $X_2$ is one member selected from the group consisting of Cl and F, and further comprising electrophoretic particles suspended therein in an amount sufficient to provide an electrophoretic effect, wherein each of said electrophoretic particles comprises titanium dioxide.

2. A liquid suspending medium according to claim 1, wherein each of said electrophoretic particles has a resin coated thereon.

3. A liquid suspending medium according to claim 2 wherein said resin is a phenolic resin.

4. A liquid suspending medium according to claim 3 wherein said phenolic resin is a resol-type phenolic resin.

5. A liquid suspending medium according to claim 4 wherein said resin contains colored pigments.

6. A liquid suspending medium according to claim 5 which additionally contains a dyestuff.

7. A liquid suspending medium according to claim 4 which additionally contains a dyestuff.

8. A liquid suspending medium according to claim 3 wherein said resin contains colored pigments.

9. A liquid suspending medium according to claim 8 which additionally contains a dyestuff.

10. A liquid suspending medium according to claim 2 wherein said resin contains colored pigments.

11. A liquid suspending medium according to claim 10 which additionally contains a dyestuff.

12. A liquid suspending medium according to claim 1 which further contains a dyestuff.

13. A liquid suspending medium according to claim 1 which includes 50 to 100 volume percent of said oligomer.

* * * * *